Sept. 1, 1936.  A. L. BARNES  2,053,125

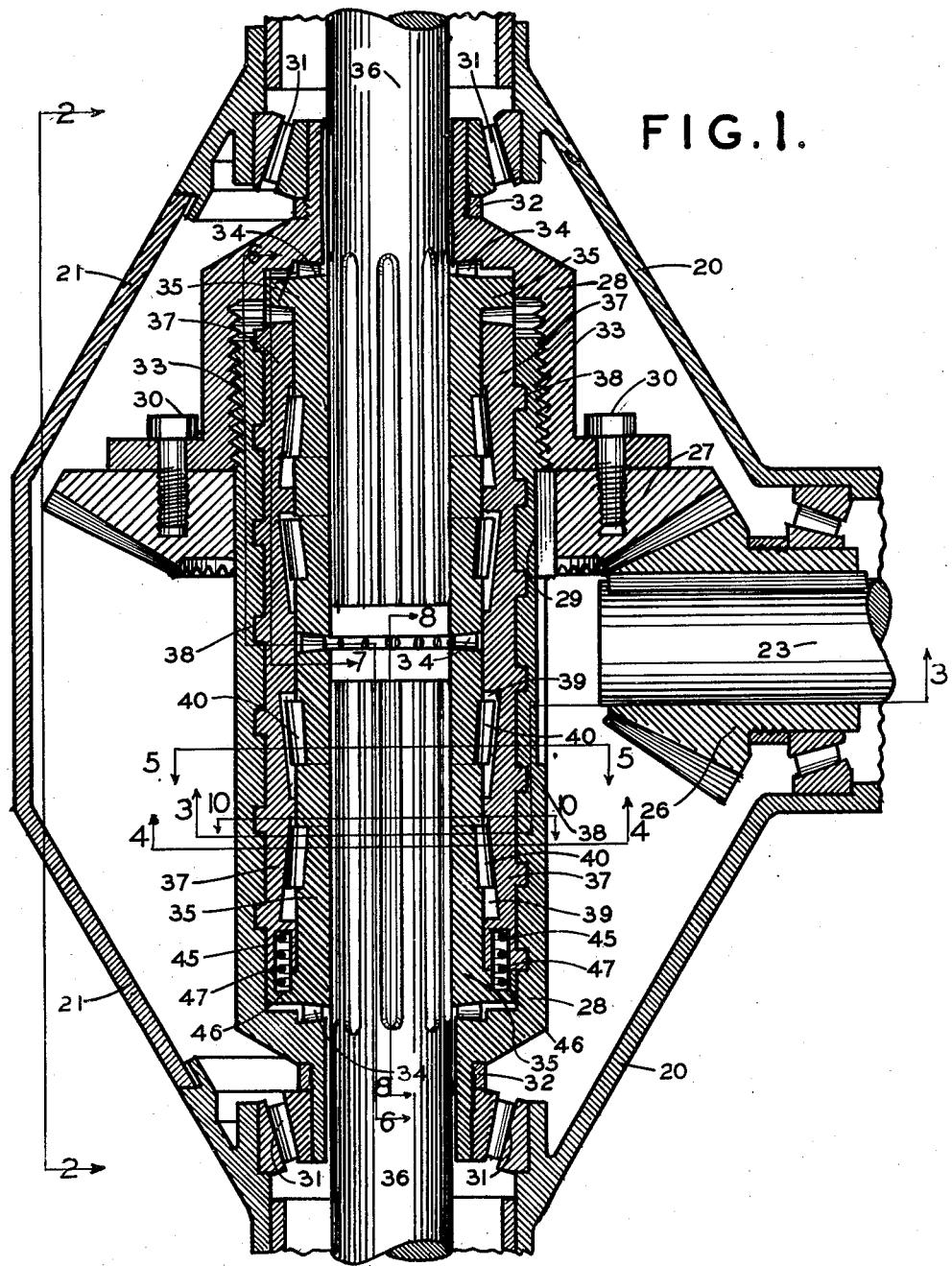

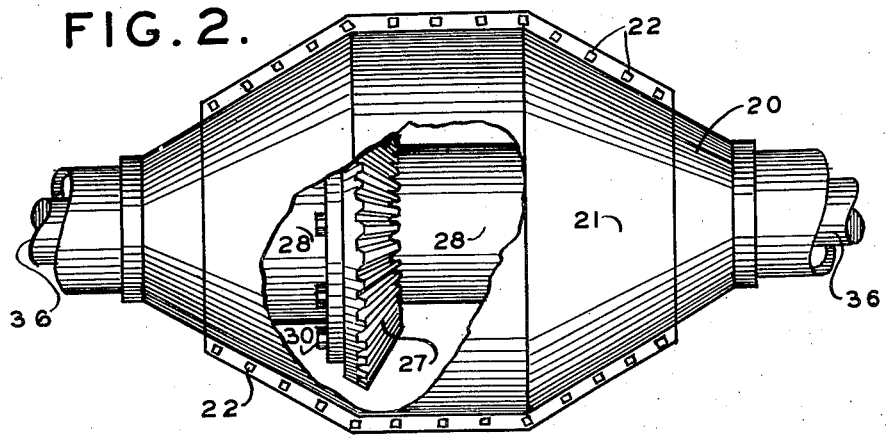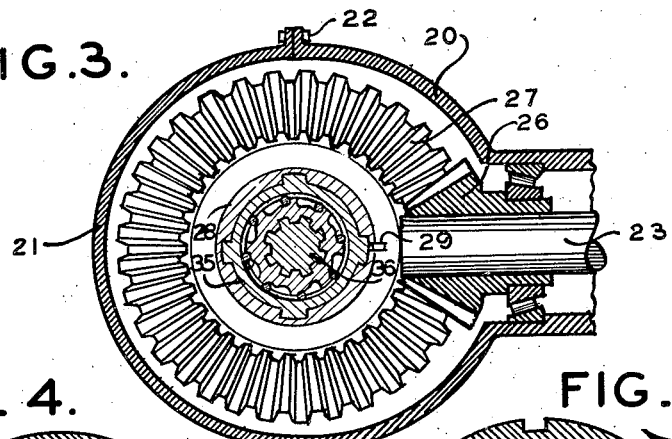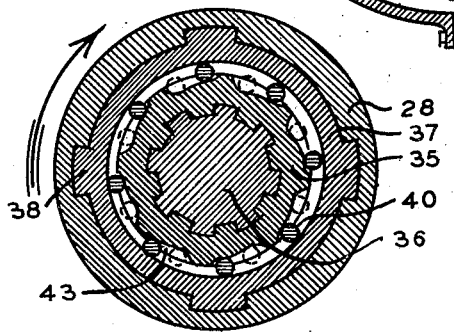

DIFFERENTIAL MECHANISM

Filed June 16, 1934  3 Sheets-Sheet 3

WITNESSES
Oswell G. Treadway
Martha J. Spear

INVENTOR
Allen L. Barnes.

Patented Sept. 1, 1936

2,053,125

UNITED STATES PATENT OFFICE 2,053,125

DIFFERENTIAL MECHANISM

Allen L. Barnes, Oak Park, Ill., assignor, by direct and mesne assignments, to Joseph H. Hinshaw, Wilmette, Ill., as trustee Application June 16, 1934, Serial No. 730,961

4 Claims. (Cl. 74—389.5)

My invention relates to new and useful improvements in differential mechanism and relates particularly to means for transmitting and distributing the driving power of a motor vehicle from the driving shaft to the right and left axles of the driving wheels.

The object of this invention is to provide a differential mechanism which will transmit a positive drive, in either direction, to the driving wheels. The present type of differential will permit one of the axles and its driving wheel to run slower than the drive shaft and will even permit it to stand still if the frictional resistance of the other wheel upon the road bed is reduced to an extent that it can slip forward in which case the entire exertion of the engine is directed to the wheel having no tractional ability and it can spin forward without driving the vehicle. My invention overcomes this paramount objectionable feature by not permitting either wheel to lag behind or run slower than its given geared ratio to the drive shaft but does permit of either wheel running faster than its geared ratio thereby providing a differentiation which is necessary in order that the vehicle may be turned from a straight line of travel, as when turning a corner. This positive drive as well as the differentiating feature operates in a similar manner when backing the vehicle or driving in reverse.

It is reasonable to assume that the two driving wheels never maintain equal and balanced tractional resistance upon the road bed over a very long period especially if the road bed is rough and the vehicle is traveling fast or at times when mud or ice is to be traversed. In such instances my invention provides means for proportioning the power relative to the tractional ability of the two driving wheels and thereby providing a more uniform drive with a consequential saving in gasoline and with less wear on the engine by preventing lurching and sudden checking which objectionable feature is possible with the present type differential. Uniform traction prevents lurching and provides more comfort for the passengers.

A further object of this invention is to provide a more compact and simple mechanism with fewer gears and wearing parts and to provide a more durable and simple construction. The present type differential contains six to eight gears consisting of, one drive pinion, one ring gear, two side gears, and two or four floating pinion gears. My differential contains only two gears namely, the drive pinion and the ring gear. These two gears can be meshed by worm teeth, helical teeth or by any other type teeth employed on any other differential without disturbing the correct operation of the mechanism.

A further object is to make possible better lubrication. The gear lubricant can be sealed from the lubricant used in the tight fitting bearings thereby increasing the life of the gears and the lubricant.

Another feature found peculiar to my invention is the reduction in the diameter of the differential to dimensions impossible in any other type differential and thereby increasing road bed clearance, permitting of lowering the center of gravity of the vehicle and reducing the sprung weight on the rear springs.

My invention provides a further advantage over the present type differential in that it conserves engine power by conserving braking power when making turns with the vehicle, for which reason it becomes especially desirable for racing cars which require a quick get-away and the conserving of engine and braking power. It is common experience with the present type differential, when making turns, to check the speed of the vehicle by closing the throttle and applying the brakes. When the throttle is closed the engine stops pulling but maintains its approximate previous speed of rotation and the roadbed resistance in making the turn tends to slow down the vehicle. In suddenly slowing down the vehicle there is a tendency for the engine to maintain its previous speed due to rotating kinetic energy stored in the engine, but the engine is slowed down due to the reaction from the rear driving wheels and their direct connection to the engine causing the kinetic energy in the engine to become active in pulling the vehicle forward at a negative accelerating speed and in opposition to the brakes until much of the kinetic energy is dissipated thereby making it harder for the brakes. At the end of the turn the engine is running slow, the kinetic energy having been exhausted. Before the vehicle can regain its speed again not all of the power ouput of the engine can be used in pulling the car. A part of the power output must be absorbed or dissipated into kinetic rotating energy to the engine which ocurs just at the time when the vehicle itself needs acceleration and the entire output of the engine, and therefore hinders a quick get-away.

My invention provides a differential which will act quite the opposite from that just related and instead of wasting the engine power and the braking power, instead of the engine pulling against the brakes, the engine assists the brakes and while doing so does not dissipate the braking energy but restores it to the engine from whence it came, storing it in the form of rotating kinetic energy which in turn assists the engine in a quick get-away at the end of the turn, and is thereby to be added to the power output of the engine instead of being subtracted from it as it is in the case of the present differential.

Upon starting a turn the throttle is closed, as before and the engine and the vehicle has the same speed, but upon starting the turn the outside drive wheel in traveling a longer path rotates much faster than it did previously and due to its increased speed over the inside drive wheel, it controls the differential, due to the fact that the engine has ceased pulling, whereby it becomes active upon the differential and operates it into reverse drive position. Thereby the faster drive wheel acts independently upon the engine speeding the engine up to the faster outer wheel speed which is much greater than before. This reacts upon the vehicle as engine braking takes momentum out of the vehicle and stores it in the engine as rotating kinetic energy instead of drawing the vehicle forward in opposition to the brakes as it does with the present type differential. This peculiar action of my invention reduces the necessity of using the brakes at all on a turn by storing this otherwise wasted energy in the form of rotating kinetic energy in the engine which assists in bringing the vehicle back to its former speed.

At the end of the turn the engine has an excess of speed and energy which assists instead of hindering the quick pick up of the car speed thereby relieving the engine at the critical moment when it needs assistance the most. This feature not only makes turning safer but adds to the life of the engine and brakes.

Another marked advantage in my differential is the fact that it makes possible a very practical method of braking which has been found undesirable in conjunction with the present type differentials now in use. The use of a transmission brake, or a propeller shaft brake is much desirable from the standpoint of simplicity, durability, and appearance as well as ease of positive manipulation. However when the same is used in conjunction with the present differentials we find that when one wheel is traversing a slippery or more frictionless surface and the brakes are applied the brakes will be either entirely ineffective or to a great extent ineffective for, if one wheel can slip backward on the slippery side, then the other although upon a firm roadbed and securing good tractional contact and good braking possibilities can continue to roll forward without braking the vehicle in the least. This is very objectionable and has made obsolete this method of braking. My differential makes possible the use of this very desirable method of braking, by braking both wheels and not only that but balancing the braking perfectly between the wheels so that the wheel capable of more braking ability will receive proportionally more braking. In other words the braking is balanced proportional to the braking ability of the two wheels and will therefore prevent vehicle turning or spinning on slippery roadbeds when the brakes are applied.

My invention may be understood thoroughly by reference to the following specification and drawings in which:

Fig. 1 is a plan section taken substantially on the axis of the axle shaft of the driving mechanism;

Fig. 2 is a vertical view taken from the rear substantially on the line 2—2 of Fig. 1;

Fig. 3 is a sectional view taken substantially on the line 3—3 of Fig. 1;

Fig. 4 is a sectional view taken substantially on the line 4—4 of Fig. 1;

Fig. 5 is a sectional view taken substantially on the line 5—5 of Fig. 1;

Figure 6:
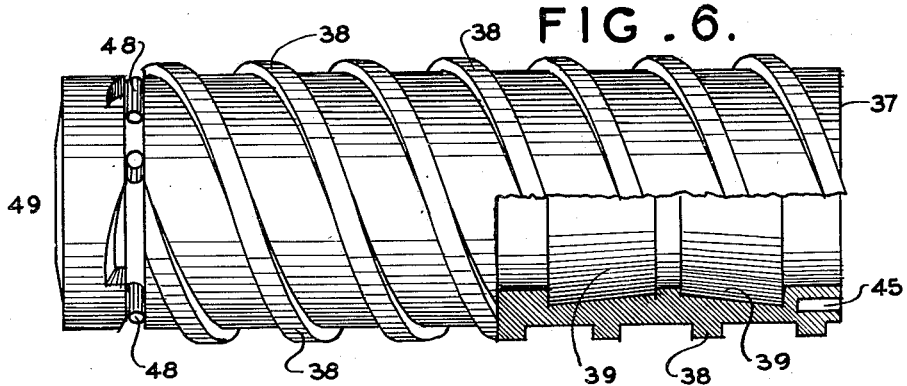
Fig. 6 is a semi-elevational view taken substantially on the line 6—6 of Fig. 1.

All the parts of the driving mechanism illustrated in the drawings are shown in their relative positions which they occupy while the vehicle is being driven in a forward direction.

Referring now to Figs. 1, 2, and 3, my differential is incased in a housing 20 having a removable cover 21 which is anchored to housing 20 by bolts 22.

A power drive shaft or drive pinion shaft 23 is shown in Figs. 1 and 3. This pinion shaft 23 extends through the front wall of the housing 20 and is keyed to a drive pinion gear 26 which is supported in a roller bearing by the front wall of the housing 20.

Drive pinion gear 26 is meshed with a driven ring gear 27, and driven ring gear 27 is keyed to a rotatable housing case 28 by key 29 and bolted to housing 28 by bolts 30.

Referring especially to Fig. 1, rotatable housing case 28 is supported within housing 20 by bearings 31 and is adjustable relative to bearings 31 by adjusting rings 32 which are threaded to rotatable housing 28. The right and the left sections of rotatable housing 28 are assembled by external and internal threads 33. Threads 33 also serve to adjust bearings 34. Bearings 34 transmit thrust to and from rotatable housing 28 and right and left axle sleeves 35 shown in Figs. 1, 3, 4, 5, 7, 8, 9, and 10. The same figures show axle sleeves 35 splined to right and left wheel driving axles 36. The same figures show interposed between axle sleeve 35 and rotatable housing 28 a tubular sleeve 37. This tubular sleeve 37 is shown in detail in Fig. 6.

Tubular sleeve 37 has provided upon its external surface, helical teeth 38 which is clearly illustrated in elevation Fig. 6 and in section in Fig. 1. These helical teeth operate in helical groove on the internal surface of rotatable housing 28 as shown in Fig. 1.

Tubular sleeve 37 has provided within its inner surface four conical surfaced annular grooves 39 shown in section Fig. 1 and in elevation in Fig. 6. Two of these conical surfaced annular grooves 39 pitch, relative to the axis of the axles, to the right and two to the left.

Figure 9:
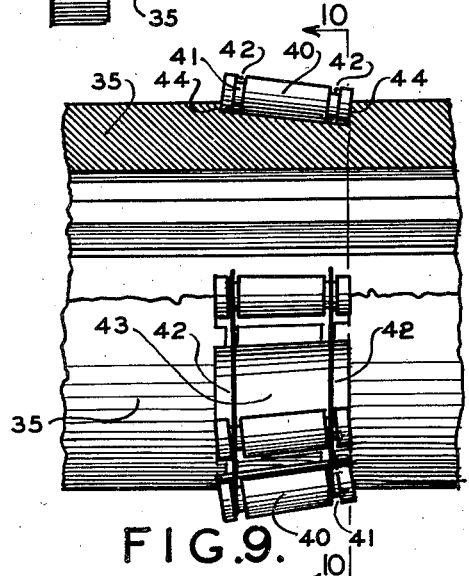
Fig. 9 is a semi-elevational view taken substantially on the line 9—9 of Fig. 10.
Figure 10:
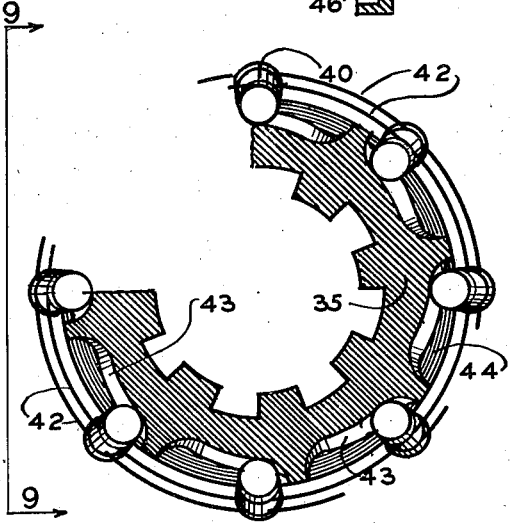
Fig. 10 is a semi-sectional view taken substantially on the line 10—10 of Fig. 1 and the line 10—10 of Fig. 9.

Active upon these conical surfaced annular grooves 39 are provided locking roller bearings 40 shown in Fig. 1 and in detail elevation in Fig. 9 and in end elevation in Fig. 10. These locking rollers 40 are slightly conical to provide correct operation about the axis of the axles 36 within a pitched bearing. Locking rollers 40 are also provided with external annular grooves 41 near the ends of locking rollers 40, shown in detail in Figs. 9 and 10. Fitted into these annular grooves 41 is provided a roller support 42 illustrated in Figs. 9 and 10. Roller support 42 is capable of expanding and contracting in length, thereby exerting a constant pull upon the locking rollers 40 in a direction toward the axis of axles 36.

Figure 7:
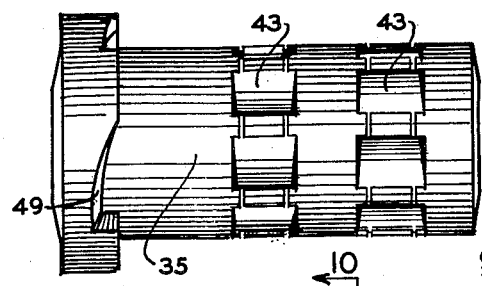
Fig. 7 is a rear elevational view taken substantially on the line 7—7 of Fig. 1.

Locking roller bearings 40 are individually supported and operative upon the cammed surface of recesses 43. The shape and arrangement of these cammed recesses 43 can best be understood by reference to the following figures: The relative, longitudinal pitch of recesses Figs. 1 and 8; the elevational view is shown in Fig. 7; detail longitudinal section and elevation Fig. 9; axial section and view in a longitudinal direction relative to the rollers and axle Fig. 10. The longitudinal pitch of cam recesses 43 toward the axis of axles 36 is slightly less than the opposing pitch of the conical surface of the annular grooves 39 which difference allows for the pitch or taper of the locking rollers 40, see Fig. 1.

The longitudinal or endwise thrust of locking rollers 40 is received by the shoulder which is formed by the sidewalls 44 of the cam recesses 43. See Fig. 10. The limits of travel of locking rollers 40 are provided at the deep ends and the shallow ends of cammed surface of recesses 43 by quickly curving the cammed surface radially outward to the cylindrical surface of the axle sleeves 35.

Figure 8:
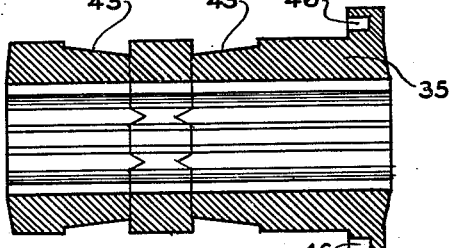
Fig. 8 is a sectional view taken substantially on the line 8—8 of Fig. 1.

Annular groove 45, Figs. 1 and 6, is cut in the right end of the tubular sleeve 37, and a corresponding annular groove 46 is cut in the flange at the right end of right axle sleeve 35 shown in Figs. 1 and 8. Annular grooves 45 and 46 oppose each other and contain a thrust spring 47 as shown in Fig. 1. This thrust spring 47 tends to thrust tubular sleeve 37 to the left relative to the flange on the right end of right axle sleeve 35.

In Figs. 1 and 6, thrust spring 47 is opposed by a series of roller thrust bearings 48 which act upon the left end of tubular sleeve 37. The thrust of tubular sleeve 37 upon these bearings 48 is opposed by annular cams 49 shown in Figs. 6 and 7. These annular cams 49 are arranged in the flange on the left end of left axle sleeve 35.

The operation of this differential in propelling the vehicle will now be explained. When the vehicle is being driven straight ahead, the power drive shaft or drive pinion shaft 23, Fig. 1, rotates counter-clockwise when looking from the rear toward the engine. Drive pinion gear 26 mounted on drive pinion shaft 23 rotates in the same direction meshing with ring gear 27. Referring to Fig. 1, the part of the ring gear 27 in contact with pinion gear 26 rotates downwardly while the opposite or rear side rotates upwardly carrying with it the rotatable housing 28, which rotates upon bearings 31. When rotatable housing 28 begins to rotate in the direction indicated it will be seen in Figs. 1 and 6, that the helical teeth 38 of tubular sleeve 37 becomes active. The first action of this helical interlocking between said rotatable housing 28 and said tubular sleeve 37 is a lateral thrust due to the cam effect of the helical teeth 38. This thrust being greater than that of the thrust spring 47 permits tubular sleeve 37 to move to the right until the right end of the tubular sleeve 37 makes contact with the flange on the right end of right axle sleeve 35. Tubular sleeve 37 cannot shift laterally any further as seen in Fig. 1, and must therefore discontinue lateral motion and be confined to rotational motion only. At this point the rotatable housing 28 and the tubular sleeve 37 must rotate together. Due to the tractional resistance of the driving wheels the axles 36 and the axle sleeves 35 splined thereto hesitate to rotate until locking rollers 40 climb as high as they can on the cam surface 43, of the axle sleeves 35.

At this stage referring to Fig. 1 it is to be seen that the two outward series of locking roller bearings 40 pitch in the same direction relative to the axis of axles 36 and are operative for forward driving, while the two inner series of locking roller bearings 40 pitch in the opposite direction and are operative for reverse driving. Fig. 4 represents the outer series of locking roller bearings 40 and the arrow indicates the direction of rotation for forward driving while Fig. 5 represents the inner series of locking roller bearings 40 and the arrow indicates the direction of rotation for forward driving. In driving the vehicle forward rotation is introduced in the direction indicated by the arrows in Figs. 4 and 5.

Referring to Fig. 7, the cam recesses 43 carrying the forward locking roller bearings in the left axle sleeve 35 are the series nearest the left axle sleeve flange and pitch in the opposite direction to those of the cam recesses 43 for reverse driving, which recesses are nearer the inner end of the same axle sleeve 35. Fig. 8 shows the lateral pitch of the cam recesses 43. Referring to Fig. 4, the locking roller bearings 40 wedge and secure a driving connection, due to the fact that the cone shape annular groove 39 has shifted to the right which action brings the portion of the annular groove 39 with a shorter annular radius to a position directly opposite the cam recesses 43.

Referring to Fig. 5, the forward driving tends to carry the rollers 40 to the bottom or deep end of their cam recesses 43 and therefore prevents driving connection in either direction of rotation until the tubular sleeve 37 is shifted to the left which would take place in reverse driving.

For reverse driving the condition shown in Figs. 4 and 5 exchange places due to the shifting of tubular sleeve 37 to the left. It is to be seen referring to Fig. 6 that the cam action of helical teeth 38 in the helical groove of rotatable housing 28 will act on the opposite side of the teeth 38 when driving in the reverse direction and therefore the tubular sleeve 37 will be thrust laterally in the opposite direction to what it would be in the case of forward driving. Therefore the portion of the surface of annular groove 39 with a greater radius will oppose cam recesses shown in Fig. 4, and a portion of the surface of annular groove 39 with a shorter radius will oppose cam recesses 43 shown in Fig. 5, and conditions shown in Fig. 4 become those shown in Fig. 5, and the conditions shown in Fig. 5 become those shown in Fig. 4.

The cam thrust rollers 48 shown in Fig. 6 roll higher on their cams 49 with forward rotation of tubular sleeve 37 and assist in the lateral shift of tubular sleeve 37 and also hold tubular sleeve 37 firmly in its position until the direction is reversed whereupon the roller bearings 48 recede upon their cam surface 49.

When the vehicle is driven from a straight course of travel, as is the case when turning a corner the outer wheel which would be the left wheel in making a right turn would travel a greater distance than the inner wheel and would cause left axle sleeve to rotate ahead of tubular sleeve 37. This condition relative to the left axle sleeve 35 and the tubular sleeve 37 would be equivalent in relative motion to reverse driving and would unlock the forward driving locking rollers 40 which drive the left axle sleeve 46 by rolling them to the deep ends of their cammed recesses 43. Referring to Fig. 1 this action cannot go farther than the locking rollers 40 and can only effect the forward drive locking rollers 40 of the left axle sleeve 35. Therefore the tubular sleeve 37 is undisturbed and cannot shift laterally. The reverse drive locking rollers 40 of the inner series on the left axle sleeve 35 cannot effect reverse driving connection which would otherwise interfere with the right axle sleeve drive and would cause one of the wheels to skid. This condition is avoided because with the tubular sleeve 37 shifted laterally to the right the portion of the surface of annular grooves 39 of tubular sleeve 37 which has a greater radius is opposing the cam recesses 43 and although the locking rollers 40 are at the top of their cam surfaces 43 they cannot quite make contact with the surface of the annular groove 39 in tubular sleeve 37. Relative action would be similar for a left turn.

When the driving wheels of a vehicle travel faster than they would otherwise travel due to the pull of the engine, there is a reaction and the engine is driven by the driving wheels instead of driving the driving wheels. The internal resistance of the engine as well as its ability to absorb kinetic energy opposes the drive from the wheels and acts similarly to that of the brakes. This is called "engine braking" and is common on straight driving as well as in turning. One of the conditions which effects engine braking is when the gas throttle is closed and the engine tends to slow down but the momentum of the car keeps the driving wheels of the vehicle rotating and turning the differential mechanism, not only without the assistance of the engine but actually driving the engine. The drag of the engine reacts through the differential mechanism in the reverse direction and is equivalent in action upon the differential to reverse driving and therefore the tubular sleeve 37 would be shifted laterally to the left and effect locking action with the reverse drive locking rollers 40 and the axle sleeves 35. On straight-away driving the engine braking action is no different to that of the present differential excepting that the wheels fully utilize their proportional tractional resistance on the road bed and therefore my invention produces better engine braking on the straight-away. The advantages with reference to making turns has already been explained previous to the description of the drawings.

Having thus described my invention, what I claim as new and desire to secure by Letters Patent is:

1. A differential mechanism for the axles of a vehicle comprising a power drive shaft, a gear mounted on said power drive shaft and meshed with a gear rotatable about the axis of driving wheel axles and secured to a rotatable housing, said rotatable housing held in position by differential bearings, two axle sleeves within said rotatable housing and splined respectively to receive the right and left wheel driving axles, a tubular sleeve spaced between said axle sleeves and said rotatable housing, a driving connection between said tubular sleeve and said rotatable housing consisting of splined interlocking members which will permit said tubular sleeve to slide longitudinally within said rotatable housing, cammed thrust bearings at one end of the tubular sleeve which will cause said tubular sleeve to travel longitudinally away from said cammed thrust bearings when said tubular sleeve is rotated in one direction, a spring acting against the opposite end of said tubular sleeve which will maintain cam contact on the cam end of said tubular sleeve and cause said tubular sleeve to travel longitudinally toward said cammed thrust bearings when said tubular sleeve is rotated in the opposite direction, and interposed between said tubular sleeve and said axle sleeves a uni-directional driving connection for each of said axle sleeves providing a drive in the same direction of rotation when said tubular sleeve is thrust longitudinally in one direction and a uni-directional driving connection providing a drive in the opposite direction of rotation for right and left axle sleeves when said tubular sleeve is thrust longitudinally in the opposite direction.

2. A differential mechanism for the axles of a vehicle comprising a power drive shaft, a gear mounted on said power drive shaft to mesh with a gear rotatable about the axis of the axles and secured to a rotatable housing, said rotatable housing being held in position by differential bearings, two axle sleeves within said rotatable housing and splined to receive respectively the right and left axles, a tubular sleeve spaced between said rotatable housing and said axle sleeves and a driving connection between said rotatable housing and said tubular sleeve consisting of helical splines which will cause said tubular sleeve to be thrust longitudinally in one direction when said tubular sleeve is rotated in a forward direction and said helical splines will cause said tubular sleeve to be thrust longitudinally in the opposite direction when said tubular sleeve is rotated in a reverse direction, and interposed between said tubular sleeve and said axle sleeves a uni-directional roller bearing driving connection for each of said axle sleeves when said tubular sleeve is thrust longitudinally providing a drive in one direction and a uni-directional roller bearing driving connection in the opposite direction of rotation for each of said axle sleeves when said tubular sleeve is thrust longitudinally providing a drive in the opposite direction.

3. A differential mechanism for the axles of a vehicle comprising a power drive shaft, a gear mounted on said power drive shaft and in mesh with a gear mounted upon and secured to a rotatable housing, said rotatable housing being composed of two sections and supported by differential bearings, two axle sleeves spaced within said rotatable housing and splined to receive respectively the right and left axles, a tubular sleeve between said rotatable housing and said axle sleeves and a driving connection between said rotatable housing and said tubular sleeve consisting of interlocking helical members which will exert a longitudinal thrust upon said tubular sleeve when said rotatable housing is rotated in one direction and will exert a longitudinal thrust upon said tubular sleeve in the opposite direction when said rotatable housing is rotated in the opposite direction, and uni-directional driving connection between said tubular sleeve and said axle sleeves when said tubular sleeve is thrust longitudinally in one direction and a uni-directional driving connection between said tubular sleeve and said axle sleeves providing a drive in the opposite direction of rotation when said tubular sleeve is thrust longitudinally in the opposite direction, thrust bearings between the adjacent ends of axle sleeves, thrust bearings between the outer ends of axle sleeves and said rotatable housing, adjustable union between the two sections of said rotatable housing providing adjustment for said axle sleeve thrust bearings, adjustable rings upon each end of said rotatable housing for the adjustment of differential bearings.

4. A differential mechanism for the axles of a vehicle comprising a power drive shaft, a gear mounted on said power drive shaft and in mesh with a gear mounted upon and secured to a rotatable housing, said rotatable housing supported by differential bearings, two axle sleeves spaced within said rotatable housing and splined to receive respectively the right and left wheel bearing axles, a tubular sleeve spaced between said rotatable housing and said axle sleeves and a driving connection between said rotatable housing and said tubular sleeve consisting of helical splines which will transmit longitudinal thrust to said tubular sleeve when said rotatable housing is rotated in a forward direction and will transmit a longitudinal thrust to said tubular sleeve in the opposite direction when said rotatable housing is rotated in the reverse direction, annular thrust cams upon flanges at the outer end of one of said axle sleeves which will exert a longitudinal thrust upon one end of said tubular sleeve when said tubular sleeve is rotated in one direction, a spring bearing on a flange of the other of said axle sleeves at its outer end which will exert a constant pressure upon the adjacent end of said tubular sleeve and will assist in thrusting said tubular sleeve longitudinally in the opposite direction when said tubular sleeve is rotated in the opposite direction from that last mentioned, and interposed between said tubular sleeve and said axle sleeves a uni-directional locking roller bearing driving connection for each of said axle sleeves when said tubular sleeve is thrust longitudinally providing a drive in one direction and a uni-directional locking roller bearing driving connection in the opposite direction of rotation for each of said axle sleeves when said tubular sleeve is thrust longitudinally providing a drive in the opposite direction.

ALLEN L. BARNES.